US012633255B2

(12) United States Patent
Kim

(10) Patent No.: US 12,633,255 B2
(45) Date of Patent: May 19, 2026

(54) GATE DRIVER, DISPLAY DEVICE INCLUDING THE GATE DRIVER, AND ELECTRONIC APPARATUS INCLUDING THE GATE DRIVER

(71) Applicant: Samsung Display Co., LTD., Yongin-si (KR)

(72) Inventor: Eok Su Kim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/203,548

(22) Filed: May 9, 2025

(65) Prior Publication Data

US 2026/0024487 A1 Jan. 22, 2026

(30) Foreign Application Priority Data

Jul. 16, 2024 (KR) ........................ 10-2024-0093697

(51) Int. Cl.
*G09G 3/32* (2016.01)

(52) U.S. Cl.
CPC ....... *G09G 3/32* (2013.01); *G09G 2310/0267* (2013.01); *G09G 2310/0291* (2013.01); *G09G 2310/0294* (2013.01); *G09G 2310/061* (2013.01); *G09G 2310/08* (2013.01); *G09G 2330/022* (2013.01)

(58) Field of Classification Search
CPC ............. G09G 3/32; G09G 2310/0267; G09G 2310/0291; G09G 2310/0294; G09G 2310/061; G09G 2310/08; G09G 2330/022
See application file for complete search history.

(56) References Cited

U.S. PATENT DOCUMENTS

| | | | | |
|---|---|---|---|---|
| 9,202,827 | B2 | 12/2015 | Koyama et al. | |
| 2013/0181747 | A1* | 7/2013 | Yoon | G11C 19/28 327/108 |
| 2019/0164478 | A1* | 5/2019 | Kim | H10K 59/131 |
| 2024/0078958 | A1* | 3/2024 | No | G11C 19/28 |

* cited by examiner

*Primary Examiner* — Chanh D Nguyen
*Assistant Examiner* — Gloryvid Figueroa-Gibson
(74) *Attorney, Agent, or Firm* — CANTOR COLBURN LLP

(57) ABSTRACT

Each of stages of a gate driver includes a first pull-up control circuit applying a previous carry signal to a first control node, a buffer circuit outputting a gate clock signal, and a pull-down circuit outputting a second low voltage. The first pull-up control circuit includes a fourth-first transistor including a control electrode connected to a previous carry input node, a first electrode connected to the previous carry input node, and a second electrode connected to a second control node, a fourth-second transistor including a control electrode connected to the previous carry input node, a first electrode connected to the second control node, and a second electrode connected to the first control node, a first inter-node capacitor connected between the previous carry input node and the second control node, and a second inter-node capacitor connected between the second control node and the first control node.

20 Claims, 14 Drawing Sheets

GATE DRIVER, DISPLAY DEVICE INCLUDING THE GATE DRIVER, AND ELECTRONIC APPARATUS INCLUDING THE GATE DRIVER

This application claims priority to Korean Patent Application No. 10-2024-0093697, filed on Jul. 16, 2024, and all the benefits accruing therefrom under 35 U.S.C. § 119, the content of which in its entirety is herein incorporated by reference.

BACKGROUND

1. Field

Embodiments relate to a display device. More particularly, embodiments relate to a gate driver with improved reliability, a display device including the gate driver, and an electronic apparatus including the display device.

2. Description of the Related Art

In general, a display device may include a display panel and a display panel driver. The display panel may display an image based on image data, and the display panel may include a plurality of gate lines, a plurality of data lines, and a plurality of pixels. The display panel driver may include a gate driver that provides gate signals to the gate lines and a data driver that provides data voltages to the data lines.

The gate driver may include a plurality of stages that generate the gate signals. Each stage may include a plurality of transistors for generating the gate signal.

If a transistor included in each stage is damaged, the stage may not be able to generate a normal gate signal, and thus, reliability of the gate driver may be degraded.

SUMMARY

Embodiments provide a gate driver with improved reliability, a display device including the gate driver, and an electronic apparatus including the display device.

In a gate driver including a plurality of stages according to embodiments, each of the plurality of stages includes a first pull-up control circuit which applies a previous carry signal to a first control node in response to the previous carry signal, wherein the previous carry signal is one of carry signals of previous stages, a buffer circuit which outputs a gate clock signal as a gate output signal in response to a signal of the first control node, and a pull-down circuit which outputs a second low voltage as the gate output signal in response to a first subsequent carry signal, wherein the first subsequent carry signal is one of carry signals of subsequent stages. The first pull-up control circuit includes a fourth-first transistor including a control electrode connected to a previous carry input node to which the previous carry signal is applied, a first electrode connected to the previous carry input node, and a second electrode connected to a second control node, a fourth-second transistor including a control electrode connected to the previous carry input node, a first electrode connected to the second control node, and a second electrode connected to the first control node, a first inter-node capacitor including a first electrode connected to the previous carry input node and a second electrode connected to the second control node, and a second inter-node capacitor including a first electrode connected to the second control node and a second electrode connected to the first control node.

In an embodiment, a capacitance of the first inter-node capacitor may be substantially equal to a capacitance of the second inter-node capacitor.

In an embodiment, a high gate voltage, which defines a high level of the gate output signal, may be applied to the second control node and the first control node based on the previous carry signal transitioning from a first low voltage less than the second low voltage to the high gate voltage. A signal of the second control node may transition to a voltage greater than the first low voltage and less than the high gate voltage based on the previous carry signal transitioning from the high gate voltage to the first low voltage.

In an embodiment, the signal of the second control node may be greater than the first low voltage and less than the signal of the first control node in a period in which the signal of the first control node is greater than the high gate voltage.

In an embodiment, each of the plurality of stages may further include an inverter which outputs one of a direct current inverter voltage and a first low voltage less than the second low voltage to a third control node based on the direct current inverter voltage and the signal of the first control node.

In an embodiment, the inverter may include a twelfth-first transistor including a control electrode which receives the direct current inverter voltage, a first electrode which receives the direct current inverter voltage, and a second electrode connected to a twelfth intermediate node, a twelfth-second transistor including a control electrode which receives the direct current inverter voltage, a first electrode connected to the twelfth intermediate node, and a second electrode, a seventh transistor including a control electrode connected to the second electrode of the twelfth-second transistor, a first electrode which receives the direct current inverter voltage, and a second electrode connected to the third control node, a thirteenth transistor including a control electrode connected to the first control node, a first electrode connected to the control electrode of the seventh transistor, and a second electrode which receives the second low voltage, and an eight transistor including a control electrode connected to the first control node, a first electrode connected to the third control node, and a second electrode which receives the first low voltage.

In an embodiment, each of the plurality of stages may further include a second pull-up control circuit which applies the first low voltage to the first control node in response to a second subsequent carry signal, wherein the second subsequent carry signal is one of the carry signals of the subsequent stages.

In an embodiment, each of the plurality of stages may further include a first hold circuit which applies the first low voltage to the first control node in response to a signal of the third control node.

In an embodiment, each of the plurality of stages may further include a second hold circuit which outputs the second low voltage as the gate output signal in response to a signal of the third control node.

In an embodiment, each of the plurality of stages may further include a carry buffer circuit which outputs a carry clock signal as a carry signal in response to the signal of the first control node, and a carry pull-down circuit which outputs the first low voltage as the carry signal in response to the first subsequent carry signal.

In an embodiment, each of the plurality of stages may further include a third hold circuit which outputs the first low voltage as the carry signal in response to a signal of the third control node.

In an embodiment, each of the plurality of stages may further include a reset circuit which applies the first low voltage to the first control node in response to a reset signal.

In an embodiment, each of the plurality of stages may further include a sensing selection circuit which applies the previous carry signal to a sensing control node in response to a first sensing signal.

In an embodiment, each of the plurality of stages may further include a first sensing control circuit which applies a high gate voltage which defines a high level of the gate output signal to the first control node in response to a signal of the sensing control node and a second sensing signal, and a second sensing control circuit which applies the first low voltage to the third control node in response to the signal of the sensing control node and the second sensing signal.

In an embodiment, each of the plurality of stages may further include a second buffer circuit which outputs a second gate clock signal as a second gate output signal in response to the signal of the first control node, and a second pull-down circuit which outputs the second low voltage as the second gate output signal in response to the first subsequent carry signal.

In an embodiment, each of the plurality of stages may further include a fourth hold circuit which outputs the second low voltage as the second gate output signal in response to a signal of a third control node.

In an embodiment, the buffer circuit may include a first transistor including a control electrode connected to the first control node, a first electrode which receives the gate clock signal, and a second electrode connected to a gate output terminal, and a first capacitor including a first electrode connected to the control electrode of the first transistor and a second electrode connected to the gate output terminal. The pull-down circuit may include a second transistor including a control electrode which receives the first subsequent carry signal, a first electrode which receives the second low voltage, and a second electrode connected to the gate output terminal.

In an embodiment, a capacitance of the first capacitor may be greater than each of a capacitance of the first inter-node capacitor and a capacitance of the second inter-node capacitor.

A display device according to embodiments includes a display panel, a gate driver including a plurality of stages which output gate signals to gate lines of the display panel, and a data driver which outputs a data voltage to a data line of the display panel. Each of the plurality of stages includes a first pull-up control circuit which applies a previous carry signal to a first control node in response to the previous carry signal, wherein the previous carry signal is one of carry signals of previous stages, a buffer circuit which outputs a gate clock signal as a gate output signal in response to a signal of the first control node, and a pull-down circuit which outputs a second low voltage as the gate output signal in response to a first subsequent carry signal, wherein the first subsequent carry signal is one of carry signals of subsequent stages. The first pull-up control circuit includes a fourth-first transistor including a control electrode connected to a previous carry input node to which the previous carry signal is applied, a first electrode connected to the previous carry input node, and a second electrode connected to a second control node, a fourth-second transistor including a control electrode connected to the previous carry input node, a first electrode connected to the second control node, and a second electrode connected to the first control node, a first inter-node capacitor including a first electrode connected to the previous carry input node and a second electrode connected to the second control node, and a second inter-node capacitor including a first electrode connected to the second control node and a second electrode connected to the first control node.

An electronic apparatus according to embodiments includes a display module including a display panel and a gate driver including a plurality of stages which output gate signals to gate lines of the display panel, and a power module including a power management circuit which supplies power to the display module. Each of the plurality of stages includes a first pull-up control circuit which applies a previous carry signal to a first control node in response to the previous carry signal, wherein the previous carry signal is one of carry signals of previous stages, a buffer circuit which outputs a gate clock signal as a gate output signal in response to a signal of the first control node, and a pull-down circuit which outputs a second low voltage as the gate output signal in response to a first subsequent carry signal, wherein the first subsequent carry signal is one of carry signals of subsequent stages. The first pull-up control circuit includes a fourth-first transistor including a control electrode connected to a previous carry input node to which the previous carry signal is applied, a first electrode connected to the previous carry input node, and a second electrode connected to a second control node, a fourth-second transistor including a control electrode connected to the previous carry input node, a first electrode connected to the second control node, and a second electrode connected to the first control node, a first inter-node capacitor including a first electrode connected to the previous carry input node and a second electrode connected to the second control node, and a second inter-node capacitor including a first electrode connected to the second control node and a second electrode connected to the first control node.

In the gate driver, the display device, and the electronic apparatus according to the embodiments, the first inter-node capacitor is connected between the previous carry input node to which the source electrode of the fourth-first transistor is connected and the second control node to which the drain electrode of the fourth-first transistor is connected, and the second inter-node capacitor is connected between the second control node to which the source electrode of the fourth-second transistor is connected and the first control node to which the drain electrode of the fourth-second transistor is connected, such that the signal of the second control node may be greater than the first low voltage and less than the signal of the first control node in a period in which the signal of the first control node is greater than the high gate voltage. Accordingly, a drain-source voltage of the fourth-second transistor may not largely increase, and an on-current of the fourth-second transistor may not decrease. As aspects of the gate driver described herein prevent the on-current of the fourth-second transistor from decreasing, the reliability of the gate driver may be improved.

BRIEF DESCRIPTION OF THE DRAWINGS

Illustrative, non-limiting embodiments will be more clearly understood from the following detailed description taken in conjunction with the accompanying drawings.

DETAILED DESCRIPTION

Figure 1:
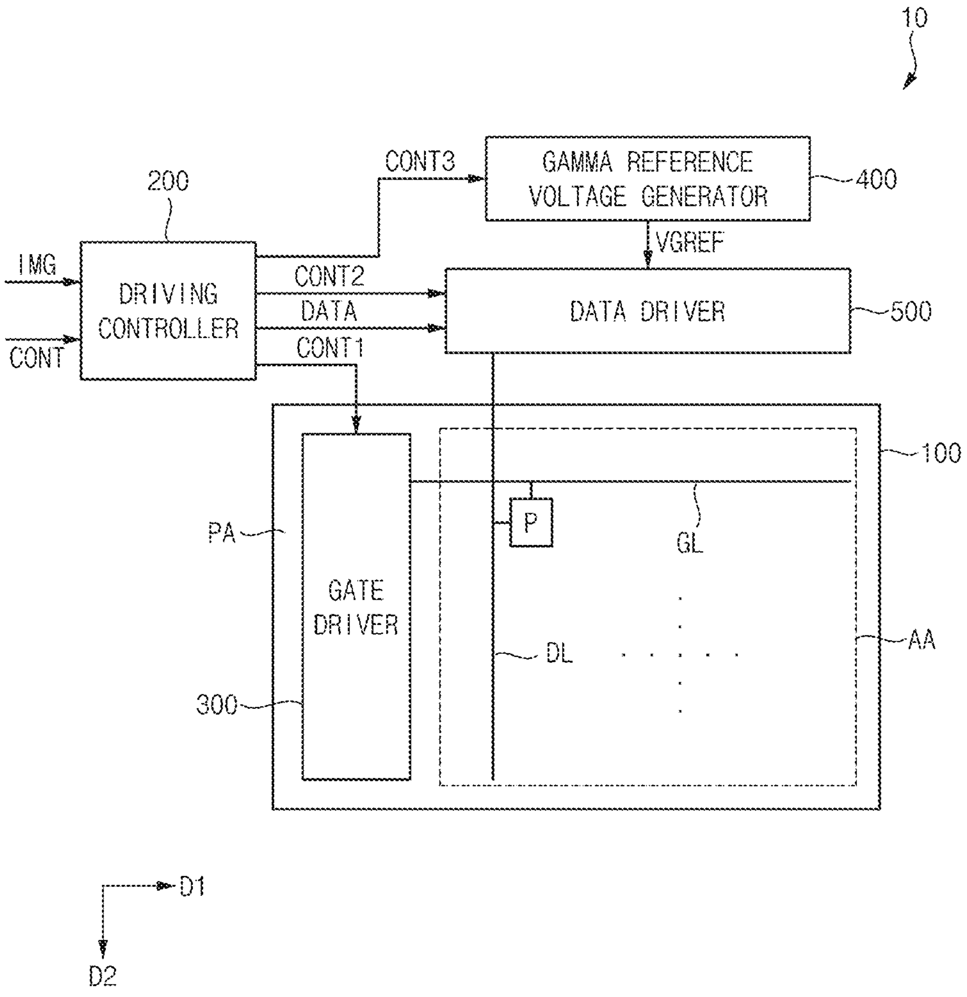
FIG. 1 is a block diagram illustrating a display device according to an embodiment.

Hereinafter, a gate driver, a display device, and an electronic apparatus according to embodiments of the present disclosure will be described in more detail with reference to the accompanying drawings. The same or similar reference numerals will be used for the same elements in the accompanying drawings.

Embodiments supported by the present disclosure will now be described more fully hereinafter with reference to the accompanying drawings, in which one or more example embodiments are illustrated. Aspects supported by the present disclosure may, however, be embodied in different forms and should not be construed as limited to the embodiments set forth herein. Rather, these example embodiments are provided so that this disclosure will be thorough and complete, and will fully convey the scope of example aspects of the invention to those skilled in the art.

Terms such as, for example, first, second, and the like may be used to describe various components, but the components should not be limited by the terms. The terms as used herein may distinguish one component from other components and are not to be limited by the terms. For example, without departing the scope of the present disclosure, a first component may be referred to as a second component, and similarly, the second component may also be referred to as the first component. The terms of a singular form may include plural forms unless otherwise specified.

The terminology used herein is for the purpose of describing particular embodiments and is not intended to be limiting. As used herein, "a," "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, comp The terms "about" or "approximately" as used herein are inclusive of the stated value and include a suitable range of deviation for the particular value as determined by one of ordinary skill in the art, considering the measurement in question and the error associated with measurement of the particular quantity. The term "about" can mean within one or more standard deviations, or within ±30%, 20%, 10%, 5% of the stated value, for example.

The term "substantially," as used herein, means approximately or actually. The term "substantially equal" means approximately or actually equal. The term "substantially the same" means approximately or actually the same. The term "substantially identical" means approximately or actually identical. The term "substantially perpendicular" means approximately or actually perpendicular.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

Embodiments are described herein with reference to cross section illustrations that are schematic illustrations of example embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases.

It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

FIG. 1 is a block diagram illustrating a display device 10 according to an embodiment.

Referring to FIG. 1, the display device 10 may include a display panel 100 and a display panel driver. The display panel driver may include a driving controller 200, a gate driver 300, a gamma reference voltage generator 400, and a data driver 500.

For example, the driving controller 200 and the data driver 500 may be integrally formed. For example, the driving controller 200, the gamma reference voltage generator 400, and the data driver 500 may be integrally formed. A driving module in which at least the driving controller 200 and the data driver 500 are integrally formed may be referred as a timing controller embedded data driver (TED).

The display panel 100 may include a display area AA for displaying an image and a peripheral area PA positioned adjacent to the display area AA.

The display panel 100 may include a plurality of gate lines GL, a plurality of data lines DL, and a plurality of pixels P electrically connected to the gate lines GL and the data lines DL. The gate lines GL may extend in a first direction D1, and the data lines DL may extend in a second direction D2 intersecting the first direction D1.

The driving controller 200 may receive input image data IMG and an input control signal CONT from an external device. For example, the input image data IMG may include red image data, green image data, and blue image data. For example, the input image data IMG may further include white image data. For example, the input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a gate control signal CONT1, a data control signal CONT2, a gamma control signal CONT3, and a data signal DATA based on the input image data IMG and the input control signal CONT.

The driving controller 200 may generate the gate control signal CONT1 for controlling an operation of the gate driver 300 based on the input control signal CONT, and may output the gate control signal CONT1 to the gate driver 300. The gate control signal CONT1 may include a vertical start signal and a gate clock signal.

The driving controller 200 may generate the data control signal CONT2 for controlling an operation of the data driver 500 based on the input control signal CONT, and may output the data control signal CONT2 to the data driver 500. The data control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the gamma control signal CONT3 for controlling an operation of the gamma reference voltage generator 400 based on the input control signal CONT, and may output the gamma control signal CONT3 to the gamma reference voltage generator 400.

The gate driver 300 may generate gate signals for driving the gate lines GL in response to the gate control signal CONT1 received from the driving controller 200. The gate driver 300 may output the gate signals to the gate lines GL. For example, the gate driver 300 may sequentially output the gate signals to the gate lines GL. For example, the gate driver 300 may be mounted on the peripheral area PA of the display panel 100. For example, the gate driver 300 may be integrated on the peripheral area PA of the display panel 100.

The gamma reference voltage generator 400 may generate a gamma reference voltage VGREF in response to the gamma control signal CONT3 received from the driving controller 200. The gamma reference voltage generator 400 may provide the gamma reference voltage VGREF to the data driver 500. For example, the gamma reference voltage generator 400 may be positioned in the driving controller 200, or may be positioned in the data driver 500.

The data driver 500 may receive the data control signal CONT2 and the data signal DATA from the driving controller 200, and may receive the gamma reference voltage VGREF from the gamma reference voltage generator 400. The data driver 500 may convert the data signal DATA into an analog data voltage using the gamma reference voltage VGREF. The data driver 500 may output the data voltage to the data line DL.

Figure 2:
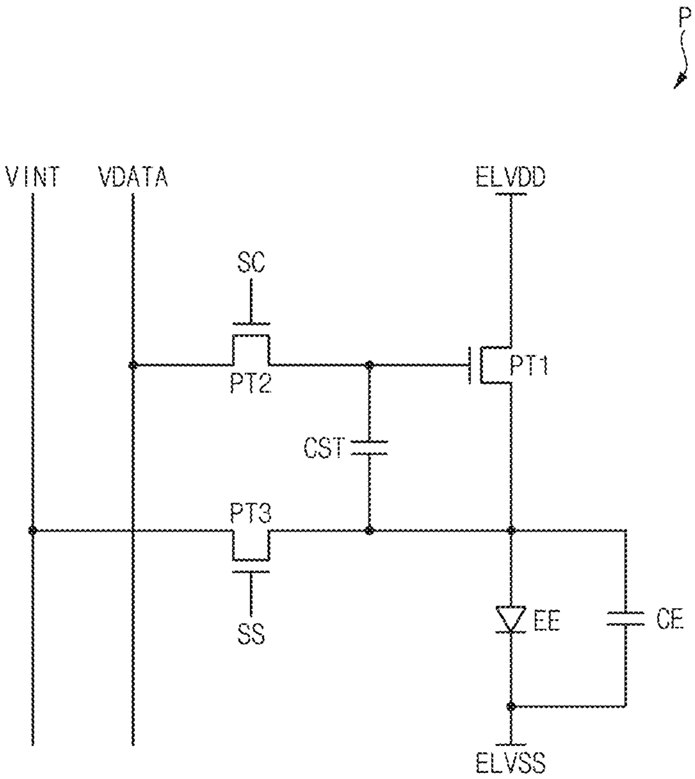
FIG. 2 is a circuit diagram illustrating a pixel of FIG. 1.

FIG. 2 is a circuit diagram illustrating the pixel P of FIG. 1.

Referring to FIGS. 1 and 2, the pixel P may include a first pixel transistor PT1, a second pixel transistor PT2, a third pixel transistor PT3, a light-emitting element EE, and a storage capacitor CST.

The first pixel transistor PT1 may include a control electrode connected to the storage capacitor CST, a first electrode to which a high power voltage ELVDD is applied, and a second electrode connected to the light-emitting element EE.

The second pixel transistor PT2 may include a control electrode to which a scan gate signal SC is applied, a first electrode to which a data voltage VDATA is applied, and a second electrode connected to the control electrode of the first pixel transistor PT1.

The third pixel transistor PT3 may include a control electrode to which a sensing gate signal SS is applied, a first electrode to which an initialization voltage VINT is applied, and a second electrode connected to the light-emitting element EE.

The light-emitting element EE may include a first electrode connected to the second electrode of the first pixel transistor PT1 and a second electrode to which a low power voltage ELVSS is applied.

The storage capacitor CST may include a first electrode connected to the control electrode of the first pixel transistor PT1 and a second electrode connected to the second electrode of the first pixel transistor PT1.

The pixel P may further include a light-emitting element capacitor CE connected between the first electrode of the light-emitting element EE and the second electrode of the light-emitting element EE. The light-emitting element capacitor CE may mean an internal capacitance of the light-emitting element EE.

When the scan gate signal SC is activated, the second pixel transistor PT2 is turned on, such that the data voltage VDATA may be applied to the control electrode of the first pixel transistor PT1.

When the sensing gate signal SS is activated, the third pixel transistor PT3 is turned on, such that the initialization voltage VINT may be applied to the second electrode of the first pixel transistor PT1.

Since the data voltage VDATA and the initialization voltage VINT are respectively applied to the control electrode and the second electrode of the first pixel transistor PT1, and the initialization voltage VINT has a constant level, a luminance of the light-emitting element EE may be controlled by a level of the data voltage VDATA.

Figure 3:
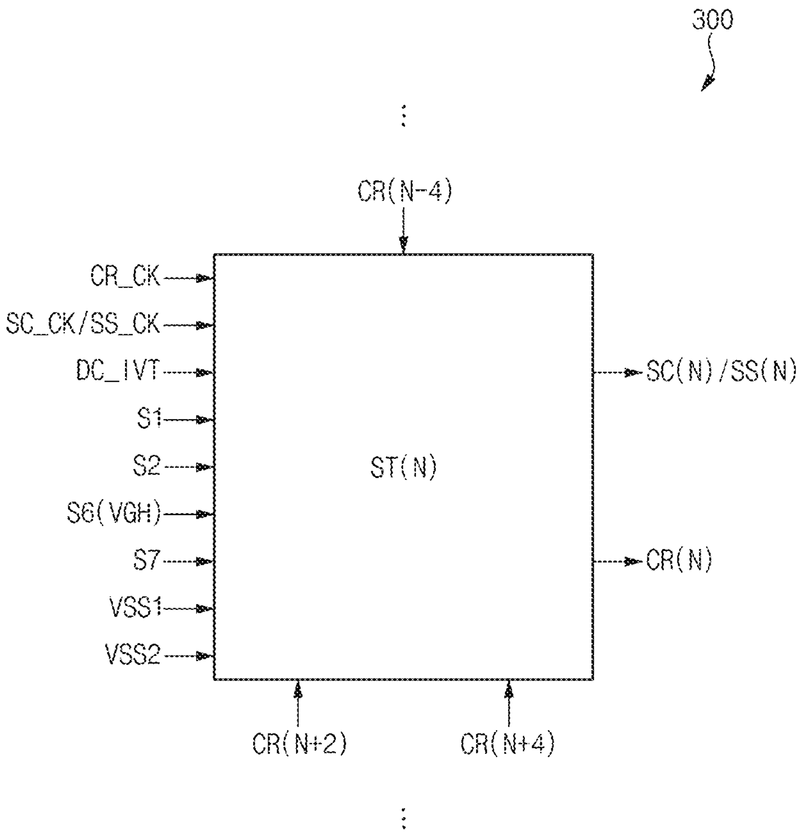
FIG. 3 is a block diagram illustrating a gate driver of FIG. 1.
Figure 4:
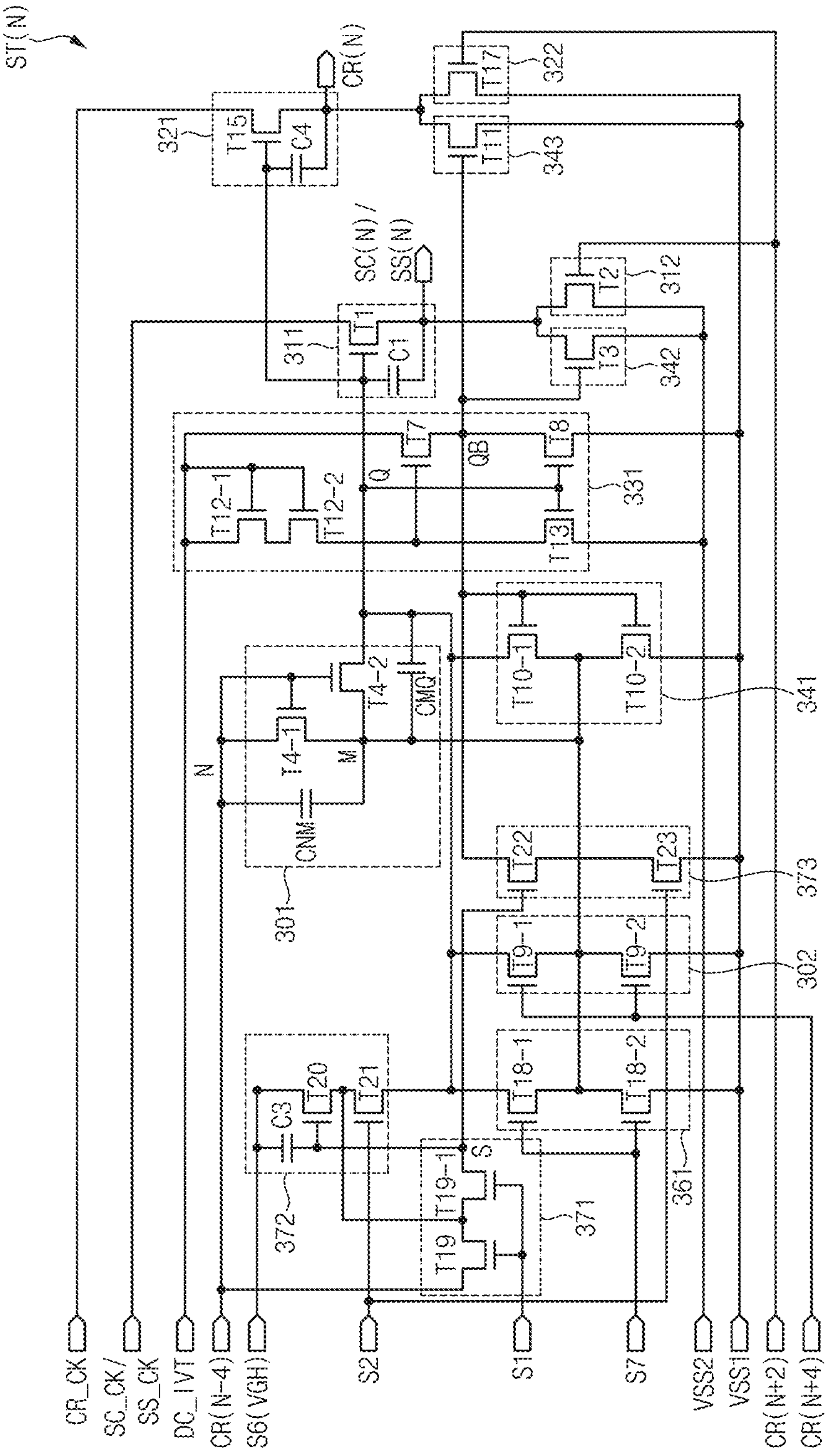
FIG. 4 is a circuit diagram illustrating a stage of FIG. 3.
Figure 5:
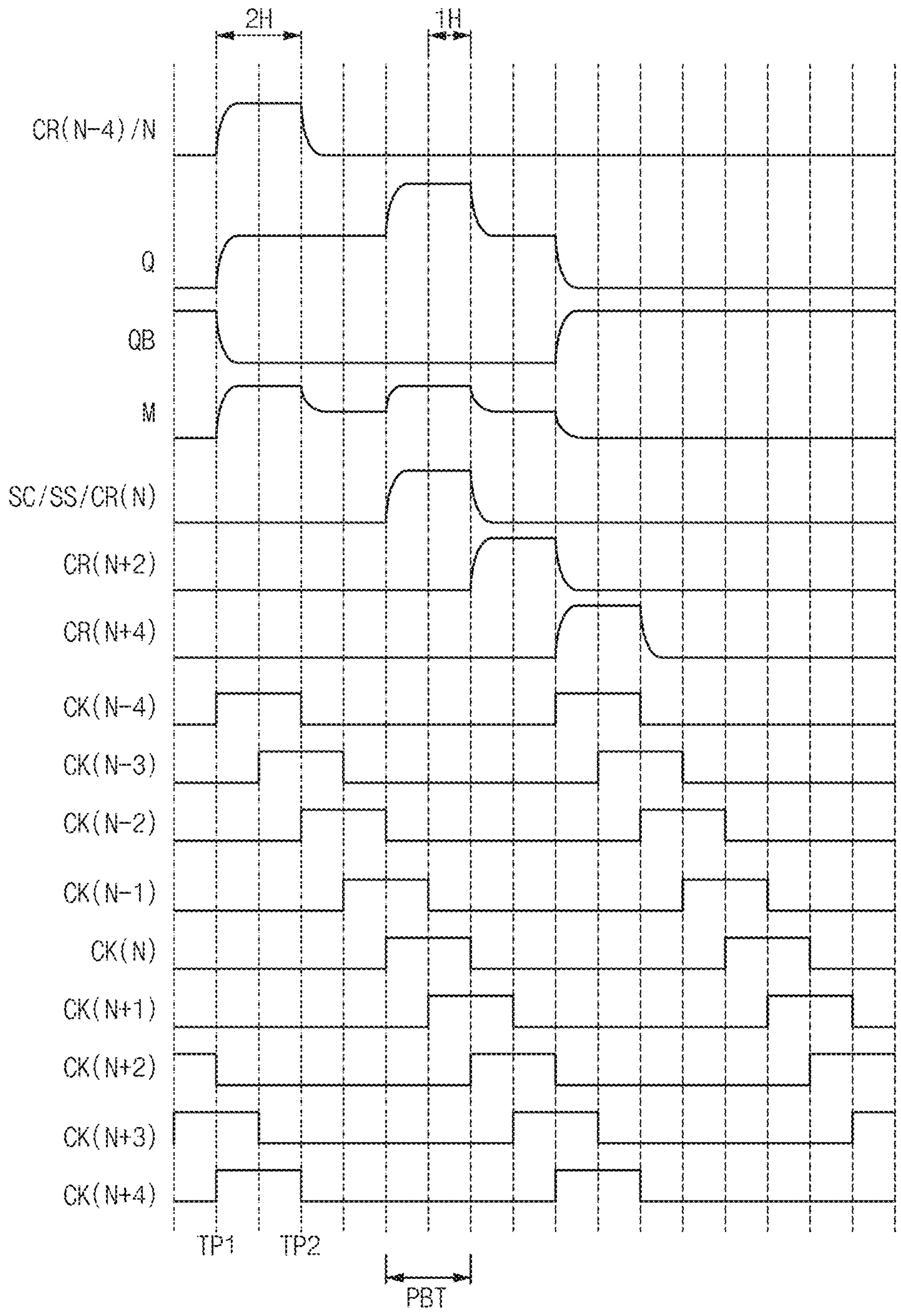
FIG. 5 is a timing diagram illustrating input signals, node signals, and an output signal of the stage of FIG. 4.

FIG. 3 is a block diagram illustrating the gate driver 300 of FIG. 1. FIG. 4 is a circuit diagram illustrating a stage ST(N) of FIG. 3. FIG. 5 is a timing diagram illustrating input signals, node signals, and an output signal of the stage ST(N) of FIG. 4.

Referring to FIGS. 1 to 5, the gate driver 300 may include a plurality of stages. For example, a first stage of the gate driver 300 may output a gate signal corresponding to a first gate line, a second stage of the gate driver 300 may output a gate signal corresponding to a second gate line, and an $N^{th}$ (N is a natural number) stage ST(N) of the gate driver 300 may output a gate signal corresponding to an $N^{th}$ gate line.

The stage ST(N) may include a first pull-up control circuit 301, a buffer circuit 311 (also referred to herein as a first buffer circuit 311), and a pull-down circuit 312 (also referred to herein as a first pull-down circuit 312).

The first pull-up control circuit 301 may apply a previous carry signal CR(N−4), which is one of carry signals of previous stages (i.e., stages previous to the stage ST(N)), to a first control node Q in response to the previous carry signal CR(N−4). In an example in which the stage ST(N) is an $N^{th}$ stage, the previous carry signal CR(N−4) may be a carry signal output from an $N-4^{th}$ stage.

For example, the first pull-up control circuit 301 may include a fourth-first transistor T4-1, a fourth-second transistor T4-2, a first inter-node capacitor CNM, and a second inter-node capacitor CMQ. The fourth-first transistor T4-1 may include a control electrode connected to a previous carry input node N to which the previous carry signal CR(N−4) is applied, a first electrode connected to the previous carry input node N, and a second electrode connected to a second control node M. The fourth-second transistor T4-2 may include a control electrode connected to the previous carry input node N, a first electrode connected to the second control node M, and a second electrode connected to the first control node Q. The first inter-node capacitor CNM may include a first electrode connected to the previous carry input node N and a second electrode connected to the second control node M. The second inter-node capacitor CMQ may include a first electrode connected to the second control node M and a second electrode connected to the first control node Q.

In an embodiment, a capacitance of the first inter-node capacitor CNM may be substantially equal to a capacitance of the second inter-node capacitor CMQ. In this case, when the fourth-first transistor T4-1 and the fourth-second transistor T4-2 are turned off (when the second control node M is floating), a signal of the second control node M may be an intermediate value between a signal of the first control node Q and a signal of the previous carry input node N.

The buffer circuit 311 may output a gate clock signal SC_CK/SS_CK as a gate output signal SC(N)/SS(N) in response to the signal of the first control node Q. Here, SC(N) may mean a scan gate signal of the $N^{th}$ stage (or current stage) ST(N), and SS(N) may mean a sensing gate signal of the $N^{th}$ stage ST(N).

For example, the buffer circuit 311 may include a first transistor T1 and a first capacitor C1. The first transistor T1 may include a control electrode connected to the first control node Q, a first electrode to which the gate clock signal SC_CK/SS_CK is applied, and a second electrode connected to a gate output terminal from which the gate output signal SC(N)/SS(N) is output. The first capacitor C1 may include a first electrode connected to the control electrode of the first transistor T1 and a second electrode connected to the gate output terminal.

In an embodiment, a capacitance of the first capacitor C1 may be greater than each of the capacitance of the first inter-node capacitor CNM and the capacitance of the second inter-node capacitor CMQ. In this case, since the first inter-node capacitor CNM, the second inter-node capacitor CMQ, and the first capacitor C1 are connected in series, a voltage applied to the first inter-node capacitor CNM and a voltage applied to the second inter-node capacitor CMQ may be greater than a voltage applied to the first capacitor C1. Further, an area of the first inter-node capacitor CNM and an area of the second inter-node capacitor CMQ may be less than an area of the first capacitor C1. Accordingly, an increase in dead space due to the addition of the first inter-node capacitor CNM and the second inter-node capacitor CMQ may be minimized.

The pull-down circuit 312 may output a second low voltage VSS2 as the gate output signal SC(N)/SS(N) in response to a first subsequent carry signal CR(N+2) which is one of carry signals of subsequent stages (i.e., stages subsequent to the stage ST(N)). In an example in which the stage ST(N) is the $N^{th}$ stage, the first subsequent carry signal CR(N+2) may be a carry signal output from an $N+2^{th}$ stage. The second low voltage VSS2 may define a low level of the gate output signal SC(N)/SS(N). For example, the second low voltage VSS2 may be about −5 V.

For example, the pull-down circuit 312 may include a second transistor T2. The second transistor T2 may include a control electrode to which the first subsequent carry signal CR(N+2) is applied, a first electrode to which the second low voltage VSS2 is applied, and a second electrode connected to the gate output terminal.

The stage ST(N) may further include an inverter 331. The inverter 331 may output one of a direct current (DC) inverter voltage DC_IVT and a first low voltage VSS1 to a third control node QB based on the DC inverter voltage DC_IVT and the signal of the first control node Q (e.g., based on the DC inverter voltage DC_IVT and in response to the signal of the first control node Q). The first low voltage VSS1 may be less than the second low voltage VSS2. For example, the first low voltage VSS1 may be about −9 V.

The DC inverter voltage DC_IVT may be less than a high gate voltage VGH which defines a high level of the gate output signal SC(N)/SS(N). The DC inverter voltage DC_IVT may be greater than the first low voltage VSS1 and the second low voltage VSS2.

For example, the inverter 331 may include a twelfth-first transistor T12-1, a twelfth-second transistor T12-2, a seventh transistor T7, a thirteenth transistor T13, and an eighth transistor T8. The twelfth-first transistor T12-1 may include a control electrode to which the DC inverter voltage DC_IVT is applied, a first electrode to which the DC inverter voltage DC_IVT is applied, and a second electrode connected to a twelfth intermediate node. The twelfth-second transistor T12-2 may include a control electrode to which the DC inverter voltage DC_IVT is applied, a first electrode connected to the twelfth intermediate node, and a second electrode. The seventh transistor T7 may include a control electrode connected to the second electrode of the twelfth-second transistor T12-2, a first electrode to which the DC inverter voltage DC_IVT is applied, and a second electrode connected to the third control node QB. The thirteenth transistor T13 may include a control electrode connected to the first control node Q, a first electrode connected to the control electrode of the seventh transistor T7, and a second electrode to which the second low voltage VSS2 is applied. The eighth transistor T8 may include a control electrode connected to the first control node Q, a first electrode connected to the third control node QB, and a second electrode to which the first low voltage VSS1 is applied.

In the present embodiment, the inverter 331 includes two transistors T12-1 and T12-2 connected in series to prevent leakage, but embodiments of the present disclosure are not limited thereto, and the inverter 331 may include one transistor to replace the twelfth-first transistor T12-1 and the twelfth-second transistor T12-2, or may include three or more transistors connected in series to replace the twelfth-first transistor T12-1 and the twelfth-second transistor T12-2.

The stage ST(N) may further include a second pull-up control circuit 302. The second pull-up control circuit 302 may apply the first low voltage VSS1 to the first control node Q in response to a second subsequent carry signal CR(N+4) which is one of the carry signals of the subsequent stages. In an example in which the stage ST(N) is the $N^{th}$ stage, the second subsequent carry signal CR(N+4) may be a carry signal output from an $N+4^{th}$ stage.

For example, the second pull-up control circuit 302 may include a ninth-first transistor T9-1 and a ninth-second transistor T9-2. The ninth-first transistor T9-1 may include a control electrode to which the second subsequent carry signal CR(N+4) is applied, a first electrode connected to the first control node Q, and a second electrode connected to a ninth intermediate node. The ninth-second transistor T9-2 may include a control electrode to which the second subsequent carry signal CR(N+4) is applied, a first electrode connected to the ninth intermediate node, and a second electrode to which the first low voltage VSS1 is applied.

In the present embodiment, the second pull-up control circuit 302 includes two transistors T9-1 and T9-2 connected in series to prevent leakage, but embodiments of the present disclosure are not limited thereto, and the second pull-up control circuit 302 may include one transistor, or may include three or more transistors connected in series.

The stage ST(N) may further include a first hold circuit 341. The first hold circuit 341 may apply the first low voltage VSS1 to the first control node Q in response to the signal of the third control node QB.

For example, the first hold circuit 341 may include a tenth-first transistor T10-1 and a tenth-second transistor T10-2. The tenth-first transistor T10-1 may include a control electrode connected to the third control node QB, a first electrode connected to the first control node Q, and a second electrode connected to a tenth intermediate node. The tenth-second transistor T10-2 may include a control electrode connected to the third control node QB, a first electrode connected to the tenth intermediate node, and a second electrode to which the first low voltage VSS1 is applied.

For example, the tenth intermediate node may be connected to the second control node M.

In the present embodiment, the first hold circuit 341 includes two transistors T10-1 and T10-2 connected in series to prevent leakage, but embodiments of the present disclosure are not limited thereto, and the first hold circuit 341 may include one transistor, or may include three or more transistors connected in series.

The stage ST(N) may further include a second hold circuit 342. The second hold circuit 342 may output the second low voltage VSS2 as the gate output signal SC(N)/SS(N) in response to the signal of the third control node QB.

For example, the second hold circuit 342 may include a third transistor T3. The third transistor T3 may include a control electrode connected to the third control node QB, a first electrode to which the second low voltage VSS2 is applied, and a second electrode connected to the gate output terminal.

The stage ST(N) may further include a carry buffer circuit 321 and a carry pull-down circuit 322. The carry buffer circuit 321 may output a carry clock signal CR_CK as a carry signal CR(N) in response to the signal of the first control node Q. The carry pull-down circuit 322 may output the first low voltage VSS1 as the carry signal CR(N) in response to the first subsequent carry signal CR(N+2).

For example, the carry buffer circuit 321 may include a fifteenth transistor T15 and a fourth capacitor C4. The fifteenth transistor T15 may include a control electrode connected to the first control node Q, a first electrode to which the carry clock signal CR_CK is applied, and a second electrode connected to a carry output terminal that outputs the carry signal CR(N). The fourth capacitor C4 may include a first electrode connected to the control electrode of the fifteenth transistor T15 and a second electrode connected to the carry output terminal.

For example, the carry pull-down circuit 322 may include a seventeenth transistor T17. The seventeenth transistor T17 may include a control electrode to which the first subsequent carry signal CR(N+2) is applied, a first electrode to which the first low voltage VSS1 is applied, and a second electrode connected to the carry output terminal.

The stage ST(N) may further include a third hold circuit 343. The third hold circuit 343 may output the first low voltage VSS1 as the carry signal CR(N) in response to the signal of the third control node QB.

For example, the third hold circuit 343 may include an eleventh transistor T11. The eleventh transistor T11 may include a control electrode connected to the third control node QB, a first electrode to which the first low voltage VSS1 is applied, and a second electrode connected to the carry output terminal.

The stage ST(N) may further include a reset circuit 361. The reset circuit 361 may apply the first low voltage VSS1 to the first control node Q in response to a reset signal S7.

For example, the reset circuit 361 may include an eighteenth-first transistor T18-1 and an eighteenth-second transistor T18-2. The eighteenth-first transistor T18-1 may include a control electrode to which the reset signal S7 is applied, a first electrode connected to the first control node Q, and a second electrode connected to an eighteenth intermediate node. The eighteenth-second transistor T18-2 may include a control electrode to which the reset signal S7 is applied, a first electrode connected to the eighteenth intermediate node, and a second electrode to which the first low voltage VSS1 is applied.

For example, the eighteenth intermediate node may be connected to the second control node M.

In the present embodiment, the reset circuit 361 includes two transistors T18-1 and T18-2 connected in series to prevent leakage, but embodiments of the present disclosure are not limited thereto, and the reset circuit 361 may include one transistor, or may include three or more transistors connected in series.

For example, the reset signal S7 may be a signal having an activation pulse at a start of a display period. For example, the reset signal S7 may be the vertical start signal. That is, when the reset signal S7 has an activation level at the start of the display period, the first control node Q may be reset to the first low voltage VSS1 by the reset circuit 361.

The stage ST(N) may further include a sensing selection circuit 371. The sensing selection circuit 371 may apply the previous carry signal CR(N−4) to a sensing control node S in response to a first sensing signal S1.

For example, the sensing selection circuit 371 may include a nineteenth transistor T19 and a nineteenth-first transistor T19-1. The nineteenth transistor T19 may include a control electrode to which the first sensing signal S1 is applied, a first electrode to which the previous carry signal CR(N−4) is applied, and a second electrode connected to a nineteenth intermediate node. The nineteenth-first transistor T19-1 may include a control electrode to which the first sensing signal S1 is applied, a first electrode connected to the nineteenth intermediate node, and a second electrode connected to the sensing control node S.

For example, the nineteenth intermediate node may be connected to the second control node M.

In the present embodiment, the sensing selection circuit 371 includes two transistors T19 and T19-1 connected in series to prevent leakage, but embodiments of the present disclosure are not limited thereto, and the sensing selection circuit 371 may include one transistor, or may include three or more transistors connected in series.

The stage ST(N) may further include a first sensing control circuit 372 and a second sensing control circuit 373. The first sensing control circuit 372 may apply the high gate voltage VGH to the first control node Q in response to a signal of the sensing control node S and a second sensing signal S2. The second sensing control circuit 373 may apply the first low voltage VSS1 to the third control node QB in response to the signal of the sensing control node S and the second sensing signal S2.

For example, the first sensing control circuit 372 may include a 20th transistor T20 and a 21st transistor T21. The 20th transistor T20 may include a control electrode connected to the sensing control node S, a first electrode to which the high gate voltage VGH is applied, and a second electrode connected to a first sensing intermediate node. The 21st transistor T21 may include a control electrode to which the second sensing signal S2 is applied, a first electrode connected to the first sensing intermediate node, and a second electrode connected to the first control node Q. Here, the high gate voltage VGH may also be referred to as a sixth sensing signal S6.

For example, the first sensing intermediate node may mean a node between the 20th transistor T20 and the 21st transistor T21.

For example, the first sensing control circuit 372 may further include a third capacitor C3. The third capacitor C3 may include a first electrode to which the high gate voltage VGH is applied and a second electrode connected to the sensing control node S.

For example, the second sensing control circuit 373 may include a 22nd transistor T22 and a 23rd transistor T23. The 22nd transistor T22 may include a control electrode connected to the sensing control node S, a first electrode connected to the third control node QB, and a second electrode connected to a second sensing intermediate node. The 23rd transistor T23 may include a control electrode to which the second sensing signal S2 is applied, a first electrode connected to the second sensing intermediate node, and a second electrode to which the first low voltage VSS1 is applied.

For example, the second sensing intermediate node may mean a node between the 22nd transistor T22 and the 23rd transistor T23.

The first sensing signal S1 may have one activation pulse in the display period, and a gate line to be sensed may be selected by the first sensing signal S1.

The third capacitor C3 may store a high level voltage when a corresponding stage is connected to the gate line to be sensed.

The second sensing signal S2 may have an activation pulse at a start of a blank period. In an example in which the second sensing signal S2 has an activation level, a gate signal may be applied to the gate line to be sensed by the first sensing signal S1.

In the present embodiment, clock signals CK(N−4) to CK(N+3) having eight different phases may be applied to the stages. In FIG. 5, CK(N+4) is illustrated for convenience of description, and may mean the same signal as CK(N−4).

In FIG. 5, each of the scan clock signal SC_CK, the sensing clock signal SS_CK, and the carry clock signal CR_CK may be one of the clock signals CK(N−4) to CK(N+3).

In the present embodiment, the clock signals CK(N−4) to CK(N+3) may have a high level for two horizontal periods (2H). Accordingly, the scan gate signal SC(N), the sensing gate signal SS(N), and the carry signal CR(N) may have a high level for two horizontal periods (2H).

The signal of the first control node Q may have a low level, a first high level (e.g., VGH), and a second high level higher than the first high level (e.g., 2VGH or higher). The signal of the second control node M may have a low level, an intermediate level, and a high level (e.g., VGH). The signal of the third control node QB may have a low level in a period where the signal of the first control node Q is at the first high level or the second high level, and may have a high level in a period where the signal of the first control node Q is at the low level.

When the previous carry signal CR(N−4) transitions from the first low voltage VSS1 to the high gate voltage VGH (TP1 in FIG. 5), the fourth-first transistor T4-1 and the fourth-second transistor T4-2 are turned on such that the high gate voltage VGH may be applied to the second control node M and the first control node Q. In an example in which the previous carry signal CR(N−4) transitions from the high gate voltage VGH to the first low voltage VSS1 (TP2 in FIG. 5), even if the fourth-first transistor T4-1 and the fourth-second transistor T4-2 are turned off, the signal of the second control node M may transition to a voltage greater than the signal of the previous carry input node N (e.g., the first low voltage VSS1) and less than the signal of the first control node Q (e.g., the high gate voltage VGH) due to a voltage distribution of the first inter-node capacitor CNM and the second inter-node capacitor CMQ. The signal of the first control node Q is boosted up by the output of the gate output signal SC(N)/SS(N), such that in a period where the signal of the first control node Q is greater than the high gate voltage VGH (for example, a period where the signal of the first control node Q has the second high level) (PBT of FIG. 5), the signal of the second control node M may be greater than the signal of the previous carry input node N (for example, the first low voltage VSS1) and less than the signal of the first control node Q (for example, a voltage of the second high level 2VGH).

Figure 6:
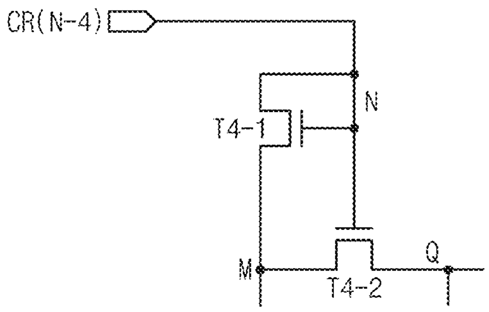
FIG. 6 is a circuit diagram illustrating a first pull-up control circuit according to a comparative example.
Figure 7:
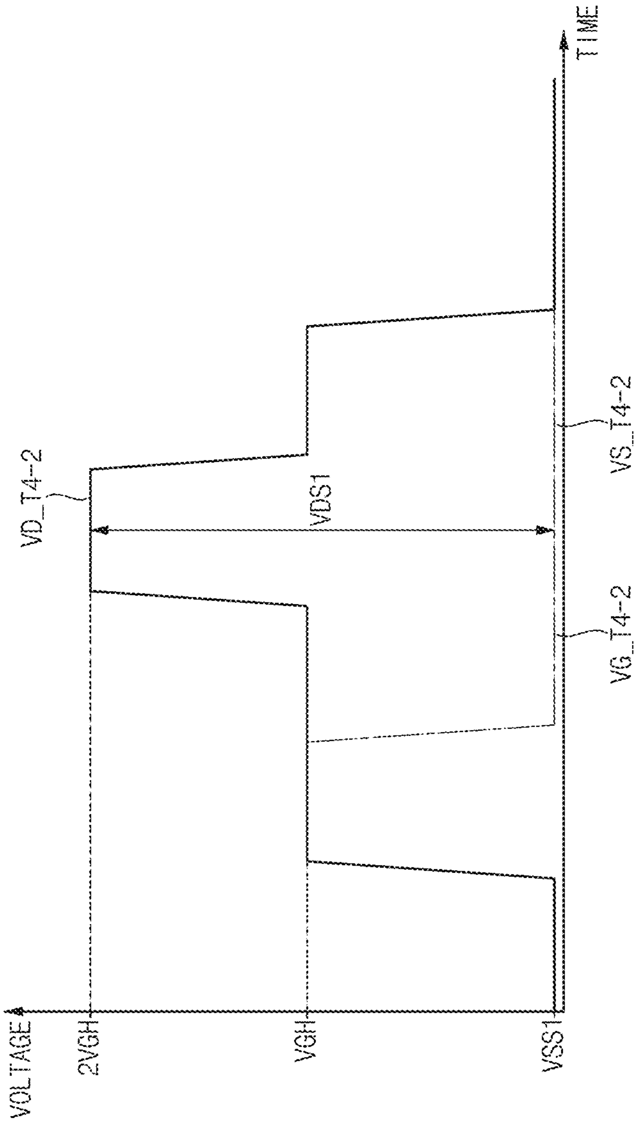
FIG. 7 is a timing diagram illustrating signals of electrodes of a fourth-second transistor of FIG. 6.
Figure 8:
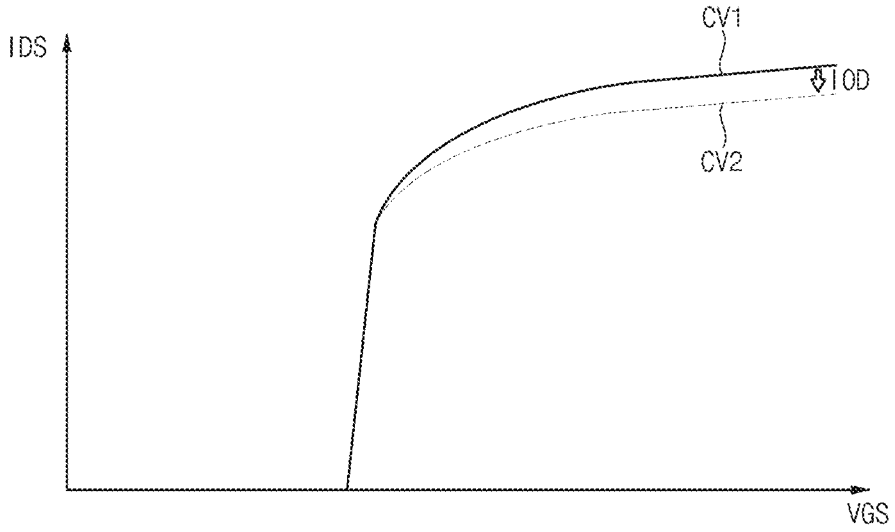
FIG. 8 is a graph illustrating a change in voltage-current characteristics of the fourth-second transistor of FIG. 6.

FIG. 6 is a circuit diagram illustrating a first pull-up control circuit according to a comparative example. FIG. 7 is a timing diagram illustrating signals of electrodes of a fourth-second transistor T4-2 of FIG. 6. FIG. 8 is a graph illustrating a change in voltage-current characteristics of the fourth-second transistor T4-2 of FIG. 6.

In the comparative example of FIG. 6, a capacitor may not be connected between the previous carry input node N and the second control node M, and a capacitor may not be connected between the second control node M and the first control node Q. In this case, when the fourth-first transistor T4-1 and the fourth-second transistor T4-2 are turned off, the signal of the second control node M may be floating.

In FIG. 7, VG_T4-2 represents a gate voltage of the fourth-second transistor T4-2, VD_T4-2 represents a drain voltage of the fourth-second transistor T4-2, and VS T4-2 represents a source voltage of the fourth-second transistor T4-2.

As illustrated in FIG. 7, the drain voltage VD_T4-2 of the fourth-second transistor T4-2 may increase to the second high level 2VGH or more of the first control node Q, the source voltage VS_T4-2 of the fourth-second transistor T4-2 may decrease to the low level VSS1 of the second control node M, and a difference VDS1 between the drain voltage VD T4-2 of the fourth-second transistor T4-2 and the source voltage VS_T4-2 of the fourth-second transistor T4-2 may be widen to 2VGH-VSS1 or more.

In FIG. 8, CV1 represents a relationship between a gate-source voltage VGS and a drain-source current IDS of the fourth-second transistor T4-2 before the gate driver is driven, and CV2 represents a relationship between the gate-source voltage VGS and the drain-source current IDS of the fourth-second transistor T4-2 after the gate driver is driven for a certain period of time.

In FIG. 8, high voltage drain stress (HVDS) may occur in the fourth-second transistor T4-2, and hot electrons having high energy due to a high electric field may be generated under the high voltage drain stress. In this case, damage may occur in a drain region of a semiconductor layer of the fourth-second transistor T4-2 due to a collision of hot electrons having the high energy. If the drain region of the semiconductor layer of the fourth-second transistor T4-2 is damaged, an on-current decrease IOD of the fourth-second transistor T4-2 may occur.

If the on-current of the fourth-second transistor T4-2 decreases, the first pull-up control circuit may not normally operate. If the first pull-up control circuit does not normally operate, the gate driver may not be able to generate a normal gate signal, and thus, the display device may not normally operate.

Figure 9:
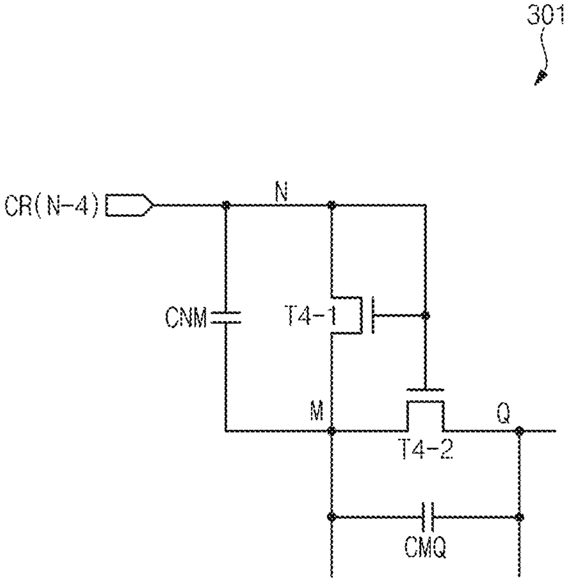
FIG. 9 is a circuit diagram illustrating a first pull-up control circuit of FIG. 4.
Figure 10:
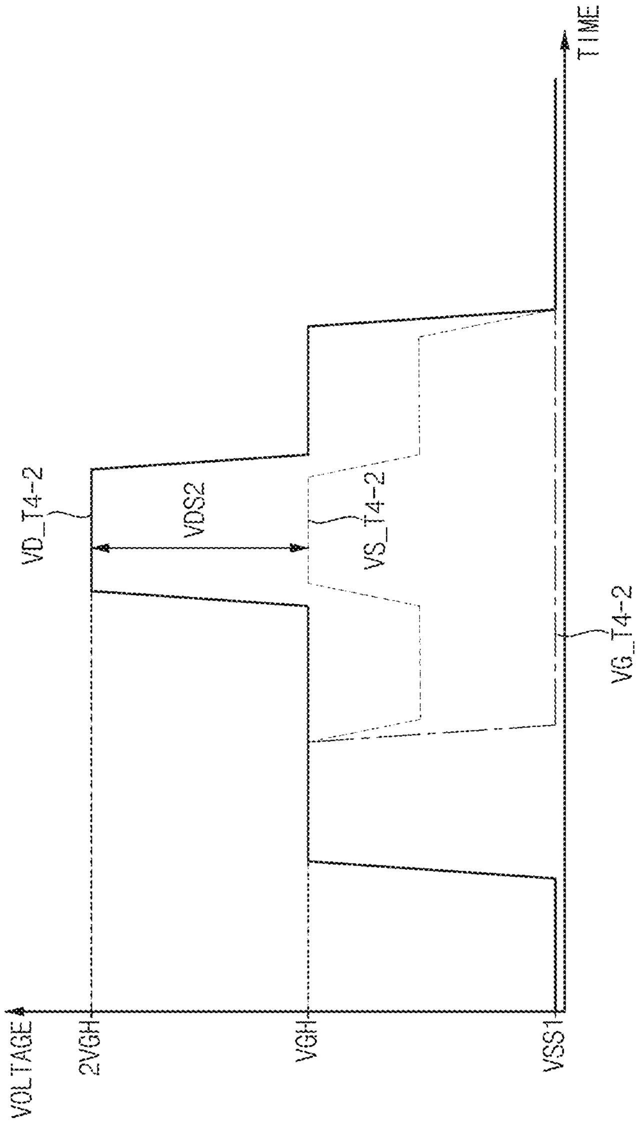
FIG. 10 is a timing diagram illustrating signals of electrodes of a fourth-second transistor of FIG. 9.
Figure 11:
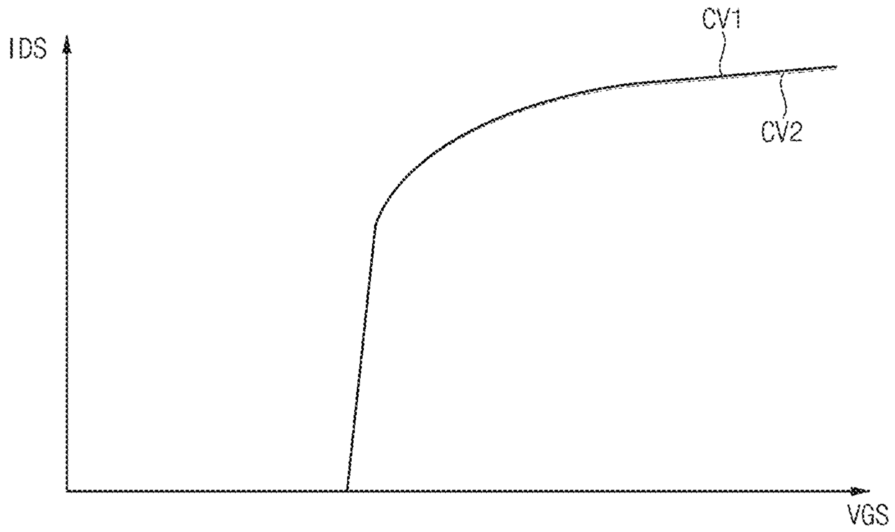
FIG. 11 is a graph illustrating a change in voltage-current characteristics of the fourth-second transistor of FIG. 9.

FIG. 9 is a circuit diagram illustrating the first pull-up control circuit 301 of FIG. 4. FIG. 10 is a timing diagram illustrating signals of electrodes of the fourth-second transistor T4-2 of FIG. 9. FIG. 11 is a graph illustrating a change in voltage-current characteristics of the fourth-second transistor T4-2 of FIG. 9.

In the present embodiment, the first inter-node capacitor CNM may be connected between the previous carry input node N and the second control node M, and the second inter-node capacitor CMQ may be connected between the second control node M and the first control node Q. In this case, even if the fourth-first transistor T4-1 and the fourth-second transistor T4-2 are turned off, the signal of the second control node M may not be floating, and the signal of the second control node M may have an intermediate value between the signal of the previous carry input node N and the signal of the first control node Q.

In FIG. 10, VG_T4-2 represents a gate voltage of the fourth-second transistor T4-2, VD_T4-2 represents a drain voltage of the fourth-second transistor T4-2, and VS_T4-2 represents a source voltage of the fourth-second transistor T4-2.

As illustrated in FIG. 10, even if the drain voltage VD_T4-2 of the fourth-second transistor T4-2 increases to the second high level 2VGH or higher of the first control node Q, the source voltage VS_T4-2 of the fourth-second transistor T4-2 may have an intermediate value (e.g., the high gate voltage VGH) between the first low voltage VSS1 and the second high level 2VGH or higher of the first control node Q, and a difference VDS2 between the drain voltage VD_T4-2 of the fourth-second transistor T4-2 and the source voltage VS_T4-2 of the fourth-second transistor T4-2 may be reduced compared to the difference (VDS1 of FIG. 7) in the comparative example.

In FIG. 11, CV1 represents a relationship between a gate-source voltage VGS and a drain-source current IDS of the fourth-second transistor T4-2 before the gate driver is driven, and CV2 represents a relationship between the gate-source voltage VGS and the drain-source current IDS of the fourth-second transistor T4-2 after the gate driver is driven for a certain period of time.

In FIG. 11, the high voltage drain stress may not occur in the fourth-second transistor T4-2, and accordingly, the on-current decrease of the fourth-second transistor T4-2 may not occur.

According to the present embodiment, the first inter-node capacitor CNM is connected between the previous carry input node N to which a source electrode of the fourth-first transistor T4-1 is connected and the second control node M to which a drain electrode of the fourth-first transistor T4-1 is connected, and the second inter-node capacitor CMQ is connected between the second control node M to which a source electrode of the fourth-second transistor T4-2 is connected and the first control node Q to which a drain electrode of the fourth-second transistor T4-2 is connected, such that even if the previous carry signal CR(N−4) transitions to the first low voltage VSS1, the signal of the second control node M may be greater than the first low voltage VSS1. Accordingly, the drain-source voltage VDS of the fourth-second transistor T4-2 may not excessively increase, and the on-current of the fourth-second transistor T4-2 may not decrease. If the on-current of the fourth-second transistor T4-2 does not decrease, the reliability of the gate driver may be improved.

Figure 12:
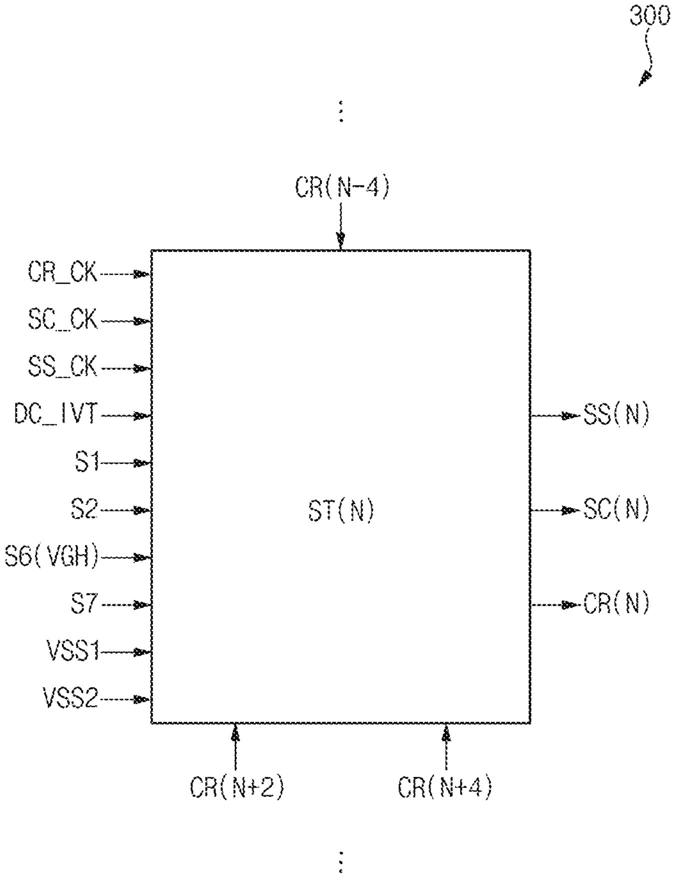
FIG. 12 is a block diagram illustrating a gate driver according to an embodiment.
Figure 13:
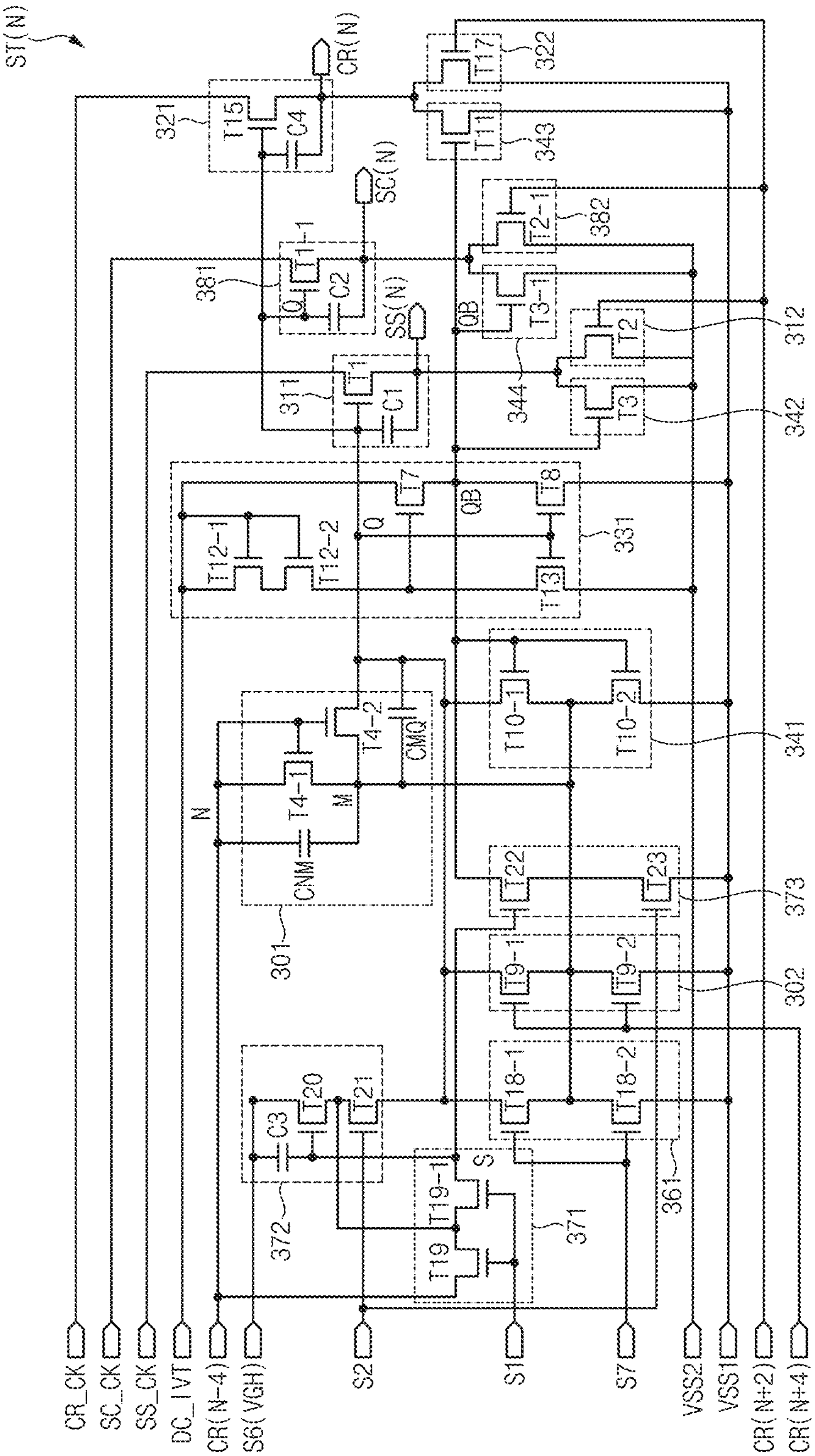
FIG. 13 is a circuit diagram illustrating a stage of FIG. 12.

FIG. 12 is a block diagram illustrating a gate driver 300 according to an embodiment. FIG. 13 is a circuit diagram illustrating a stage ST(N) of FIG. 12.

The stage ST(N) of the gate driver 300 according to the present embodiment is substantially the same as or similar to the stage ST(N) of the gate driver 300 of FIGS. 3 to 5 and 9 to 11, except that the stage ST(N) further includes a second buffer circuit, a second pull-down circuit, and a fourth hold circuit. Accordingly, the same reference numerals are used for the same or similar components, and redundant descriptions are omitted.

Referring to FIGS. 12 and 13, the stage ST(N) may include a first pull-up control circuit 301, a first buffer circuit 311, and a first pull-down circuit 312.

The first buffer circuit 311 may output a first gate clock signal SS_CK as a first gate output signal SS(N) in response to a signal of a first control node Q. Here, SS(N) may mean a sensing gate signal of the $N^{th}$ stage (or current stage) ST(N).

For example, the first buffer circuit 311 may include a first transistor T1 and a first capacitor C1. The first transistor T1 may include a control electrode connected to the first control node Q, a first electrode to which the first gate clock signal SS_CK is applied, and a second electrode connected to a first gate output terminal that outputs the first gate output signal SS(N). The first capacitor C1 may include a first electrode connected to the control electrode of the first transistor T1 and a second electrode connected to the first gate output terminal.

The first pull-down circuit 312 may output a second low voltage VSS2 as the first gate output signal SS(N) in response to a first subsequent carry signal CR(N+2).

For example, the first pull-down circuit 312 may include a second transistor T2. The second transistor T2 may include a control electrode to which the first subsequent carry signal CR(N+2) is applied, a first electrode to which the second low voltage VSS2 is applied, and a second electrode connected to the first gate output terminal.

The stage ST(N) may further include a second hold circuit 342. The second hold circuit 342 may output the second low voltage VSS2 as the first gate output signal SS(N) in response to a signal of a third control node QB.

For example, the second hold circuit 342 may include a third transistor T3. The third transistor T3 may include a control electrode connected to the third control node QB, a first electrode to which the second low voltage VSS2 is applied, and a second electrode connected to the first gate output terminal.

The stage ST(N) may further include a second buffer circuit 381 and a second pull-down circuit 382. The second buffer circuit 381 may output a second gate clock signal SC CK as a second gate output signal SC(N) in response to the signal of the first control node Q. The second pull-down circuit 382 may output the second low voltage VSS2 as the second gate output signal SC(N) in response to the first subsequent carry signal CR(N+2). Here, SC(N) may mean a scan gate signal of the $N^{th}$ stage (or current stage).

For example, the second buffer circuit 381 may include a first-first transistor T1-1 and a second capacitor C2. The first-first transistor T1-1 may include a control electrode connected to the first control node Q, a first electrode to which the second gate clock signal SC_CK is applied, and a second electrode connected to a second gate output terminal which outputs the second gate output signal SC(N). The second capacitor C2 may include a first electrode connected to the control electrode of the first-first transistor T1-1 and a second electrode connected to the second gate output terminal.

For example, the second pull-down circuit 382 may include a second-first transistor T2-1. The second-first transistor T2-1 may include a control electrode to which the first subsequent carry signal CR(N+2) is applied, a first electrode to which the second low voltage VSS2 is applied, and a second electrode connected to the second gate output terminal.

The stage ST(N) may further include a fourth hold circuit 344. The fourth hold circuit 344 may output the second low voltage VSS2 as the second gate output signal SC(N) in response to the signal of the third control node QB.

For example, the fourth hold circuit 344 may include a third-first transistor T3-1. The third-first transistor T3-1 may include a control electrode connected to the third control node QB, a first electrode to which the second low voltage VSS2 is applied, and a second electrode connected to the second gate output terminal.

Figure 14:
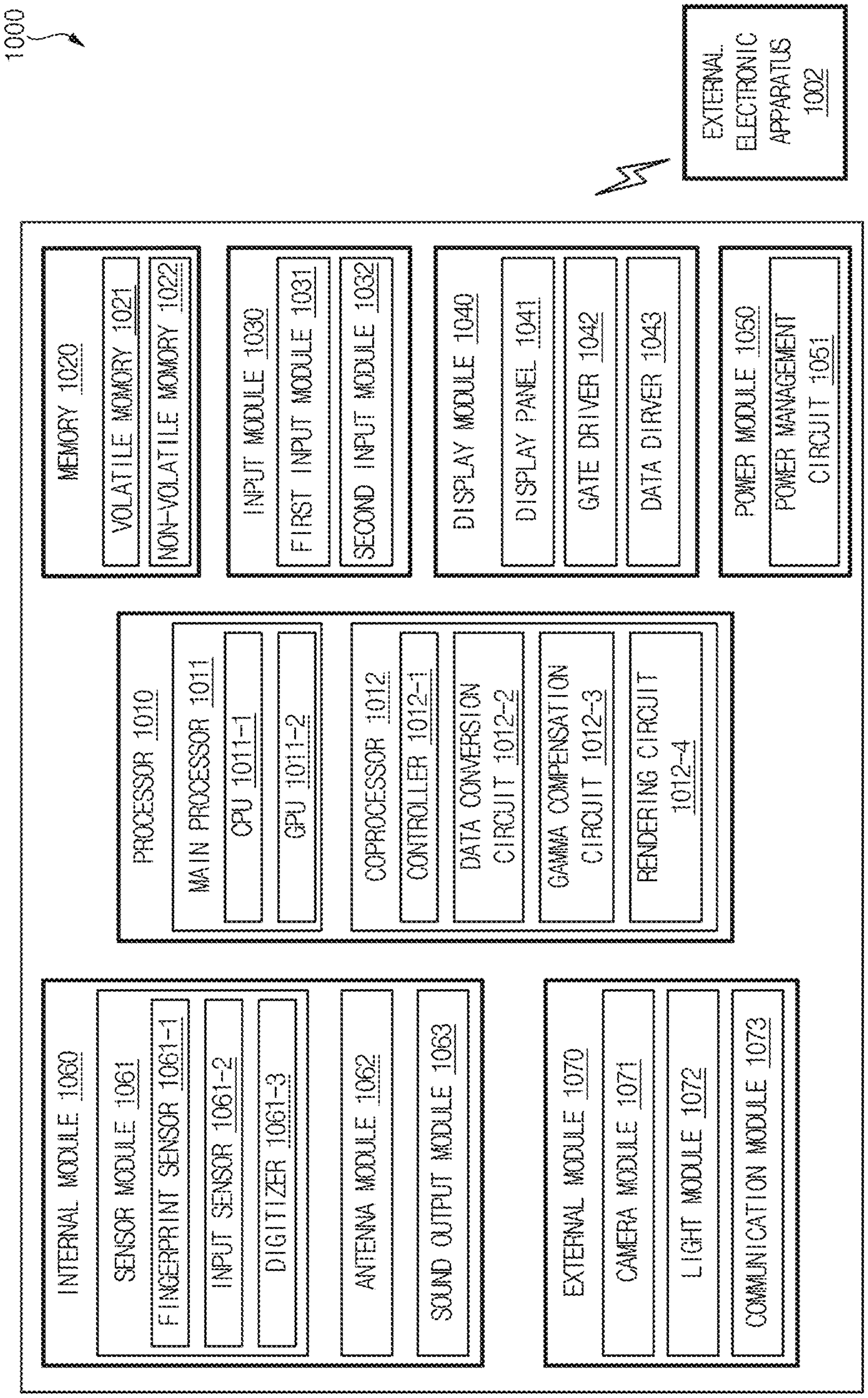
FIG. 14 is a block diagram illustrating an electronic apparatus according to an embodiment.
Figure 15:
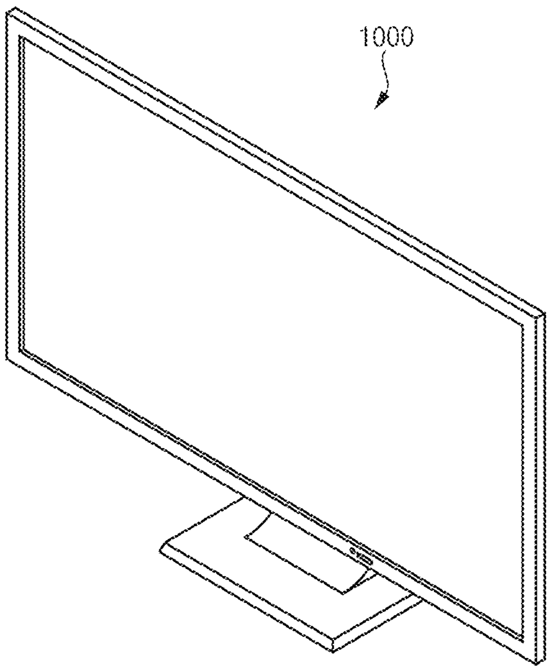
FIG. 15 is a diagram illustrating an example in which the electronic apparatus of FIG. 14 is implemented as a computer monitor.

FIG. 14 is a block diagram illustrating an electronic apparatus 1000 according to an embodiment. FIG. 15 is a diagram illustrating an example in which the electronic apparatus 1000 of FIG. 14 is implemented as a computer monitor.

Referring to FIGS. 14 and 15, the electronic apparatus 1000 may output various information through a display module 1040 within operating system. In an example in which a processor 1010 executes an application stored in a memory 1020, the display module 1040 may provide application information to a user through a display panel 1041.

In an embodiment, as illustrated in FIG. 15, the electronic apparatus 1000 may be implemented as a computer monitor. However, embodiments of the present disclosure are not limited thereto, and in another embodiment, the electronic apparatus 1000 may be implemented as a television, a mobile phone, a video phone, a smart pad, a smart watch, a tablet PC, a vehicle navigation, a laptop, a head mounted display device, or the like.

The processor 1010 may obtain an external input through an input module 1030 or a sensor module 1061, and may execute an application corresponding to the external input. In an example in which the user selects a camera icon displayed on the display panel 1041, the processor 1010 may obtain a user input through an input sensor 1061-2, and may activate a camera module 1071. The processor 1010 may transmit image data corresponding to a captured image acquired through the camera module 1071 to the display module 1040. The display module 1040 may display an image corresponding to the captured image through the display panel 1041. Some of components of the electronic apparatus 1000 may be integrated and provided as one component, or one component may be provided separately into two or more components.

The electronic apparatus 1000 may communicate with an external electronic apparatus 1002 through a network (e.g., a short-range wireless communication network or a long-range wireless communication network). In an embodiment, the electronic apparatus 1000 may include the processor 1010, the memory 1020, the input module 1030, the display module 1040, a power module 1050, an internal module 1060, and an external module 1070. In an embodiment, the electronic apparatus 1000 may omit at least one of the above-described components, or one or more other components may be added. In an embodiment, some of the above-described components (e.g., a sensor module 1061, an antenna module 1062, or a sound output module 1063) may be integrated into another component (e.g., the display module 1040).

The processor 1010 may execute software to control at least one other component (e.g., hardware or software component) of the electronic apparatus 1000 connected to the processor 1010, and may perform various data processing or calculation. In an embodiment, as at least part of data processing or calculation, the processor 1010 may store commands or data received from another component (e.g., the input module 1030, the sensor module 1061, or a communication module 1073) in a volatile memory 1021, may process the commands or data stored in the volatile memory 1021, and may store resultant data in a non-volatile memory 1022.

The processor 1010 may include a main processor 1011 and a coprocessor 1012. The main processor 1011 may include one or more of a central processing unit (CPU)

1011-1 or an application processor (AP). The main processor 1011 may further include one or more of a graphics processing unit (GPU) 1011-2, a communication processor (CP), and an image signal processor (ISP). At least two of the above-described processing unit and processor may be implemented as an integrated component (e.g., a single chip), or each may be implemented as an independent component (e.g., a plurality of chips).

The coprocessor 1012 may include a controller 1012-1. The controller 1012-1 may include an interface conversion circuit and a timing control circuit. The controller 1012-1 may receive an image signal from the main processor 1011, may convert data format of the image signal to suit the interface specifications with the display module 1040, and may output image data. The controller 1012-1 may output various control signals supportive of driving the display module 1040.

The coprocessor 1012 may further include a data conversion circuit 1012-2, a gamma correction circuit 1012-3, a rendering circuit 1012-4, or other circuits. The data conversion circuit 1012-2 may receive the image data from the controller 1012-1, and may compensate the image data such that the image is displayed at a desired luminance according to the characteristics of the electronic apparatus 1000 or the user's settings or may convert the image data to reduce power consumption or compensate for afterimages. The gamma correction circuit 1012-3 may convert the image data or a gamma reference voltage such that an image displayed on the electronic apparatus 1000 has desired gamma characteristics. The rendering circuit 1012-4 may receive the image data from the controller 1012-1, and may render the image data by considering a pixel arrangement of the display panel 1041 applied to the electronic apparatus 1000. At least one of the data conversion circuit 1012-2, the gamma correction circuit 1012-3, and the rendering circuit 1012-4 may be integrated into another component (e.g., the main processor 1011 or a controller). At least one of the data conversion circuit 1012-2, the gamma correction circuit 1012-3, and the rendering circuit 1012-4 may be integrated into a data driver 1043 to be described herein.

The memory 1020 may store various data used by at least one component of the electronic apparatus 1000 (e.g., the processor 1010 or the sensor module 1061) and input data or output data for commands related thereto. The memory 1020 may include at least one of the volatile memory 1021 and the non-volatile memory 1022.

The input module 1030 may receive commands or data to be used in components of the electronic apparatus 1000 (e.g., the processor 1010, the sensor module 1061, or the sound output module 1063) from the outside of the electronic apparatus 1000 (e.g., the user or the external electronic apparatus 1002).

The input module 1030 may include a first input module 1031 through which commands or data are input from the user, and a second input module 1032 through which command or data are input from the external electronic apparatus 1002. The first input module 1031 may include a microphone, a mouse, a keyboard, a key (e.g., button), or a pen (e.g., passive pen or active pen). The second input module 1032 may support a designated protocol that may connect to the external electronic apparatus 1002 by wire or wirelessly. In an embodiment, the second input module 1032 may include a high definition multimedia interface (HDMI), a universal serial bus (USB) interface, an SD card interface, or an audio interface. The second input module 1032 may include a connector that may be physically connected to the external electronic apparatus 1002, for example, an HDMI connector, a USB connector, an SD card connector, or an audio connector (e.g., a headphone connector).

The display module 1040 may provide visual information to the user. The display module 1040 may include the display panel 1041, a gate driver 1042, and the data driver 1043. The display module 1040 may further include a window, a chassis, and a bracket to protect the display panel 1041. The display module 1040 may correspond to the display device 10 of FIG. 1. The display panel 1041, the gate driver 1042, and the data driver 1043 may correspond to the display panel 100, the gate driver 300, and the data driver 500 of FIG. 1, respectively.

The power module 1050 may supply power to components of the electronic apparatus 1000. The power module 1050 may include a battery that charges power voltage. The battery may include a non-rechargeable primary cell, a rechargeable secondary cell, or a fuel cell. The power module 1050 may include a power management circuit 1051. The power management circuit 1051 may supply optimized power to each of the above-described modules and the modules described herein. The power module 1050 may include a wireless power transmission/reception member electrically connected to the battery. The wireless power transmission/reception member may include a plurality of coil-shaped antenna radiators.

The electronic apparatus 1000 may further include the internal module 1060 and the external module 1070. The internal module 1060 may include the sensor module 1061, the antenna module 1062, and the sound output module 1063. The external module 1070 may include the camera module 1071, a light module 1072, and a communication module 1073.

The sensor module 1061 may detect an input by the user's body or an input by the pen among the first input module 1031, and may generate an electrical signal or a data value corresponding to the input. The sensor module 1061 may include at least one of a fingerprint sensor 1061-1, an input sensor 1061-2, and a digitizer 1061-3.

The processor 1010 may output commands or data to the display module 1040, the sound output module 1063, the camera module 1071, or the light module 1072 based on the input data received from the input module 1030. For example, the processor 1010 may generate image data in response to input data applied through the mouse or the active pen and output the image data to the display module 1040, or may generate command data in response to the input data to output the command data to the camera module 1071 or the light module 1072. In an example in which no input data is received from the input module 1030 for a certain period of time, the processor 1010 may switch an operation mode of the electronic apparatus 1000 to a low-power mode or a sleep mode to reduce power consumption of the electronic apparatus 1000.

The processor 1010 may output commands or data to the display module 1040, the sound output module 1063, the camera module 1071, or the light module 1072 based on sensing data received from the sensor module 1061. For example, the processor 1010 may compare authentication data authorized by the fingerprint sensor 1061-1 with authentication data stored in the memory 1020, and then may execute an application according to the comparison result. The processor 1010 may execute command or output corresponding image data to the display module 1040 based on sensing data detected by the input sensor 1061-2 or the digitizer 1061-3. In an example in which the sensor module 1061 includes a temperature sensor, the processor 1010 may receive temperature data for a temperature measured from the sensor module 1061, and may further perform luminance correction for the image data or the like based on the temperature data.

The display device according to the embodiments may be applied to a display device included in a computer, a notebook, a mobile phone, a smart phone, a smart pad, a smart watch, a PMP, a PDA, an MP3 player, or the like.

Although the gate driver, the display device, and the electronic apparatus according to the embodiments have been described with reference to the drawings, the illustrated embodiments are examples, and may be modified and changed by a person having ordinary knowledge in the relevant technical field without departing from the technical spirit described in the following claims.

What is claimed is:

1. A gate driver comprising a plurality of stages, each of the plurality of stages comprising:

- a first pull-up control circuit which applies a previous carry signal to a first control node in response to the previous carry signal, wherein the previous carry signal is one of carry signals of previous stages;
- a buffer circuit which outputs a gate clock signal as a gate output signal in response to a signal of the first control node; and
- a pull-down circuit which outputs a second low voltage as the gate output signal in response to a first subsequent carry signal, wherein the first subsequent carry signal is one of carry signals of subsequent stages,
- wherein the first pull-up control circuit comprises:
  - a fourth-first transistor comprising a control electrode connected to a previous carry input node to which the previous carry signal is applied, a first electrode connected to the previous carry input node, and a second electrode connected to a second control node;
  - a fourth-second transistor comprising a control electrode connected to the previous carry input node, a first electrode connected to the second control node, and a second electrode connected to the first control node;
  - a first inter-node capacitor comprising a first electrode connected to the previous carry input node and a second electrode connected to the second control node; and
  - a second inter-node capacitor comprising a first electrode connected to the second control node and a second electrode connected to the first control node.

2. The gate driver of claim 1, wherein a capacitance of the first inter-node capacitor is substantially equal to a capacitance of the second inter-node capacitor.

3. The gate driver of claim 1, wherein:

- a high gate voltage, which defines a high level of the gate output signal, is applied to the second control node and the first control node based on the previous carry signal transitioning from a first low voltage less than the second low voltage to the high gate voltage, and
- a signal of the second control node transitions to a voltage greater than the first low voltage and less than the high gate voltage based on the previous carry signal transitioning from the high gate voltage to the first low voltage.

4. The gate driver of claim 3, wherein the signal of the second control node is greater than the first low voltage and less than the signal of the first control node in a period in which the signal of the first control node is greater than the high gate voltage.

5. The gate driver of claim 1, wherein each of the plurality of stages further comprises:

- an inverter which outputs one of an direct current inverter voltage and a first low voltage less than the second low voltage to a third control node based on the direct current inverter voltage and the signal of the first control node.

6. The gate driver of claim 5, wherein the inverter comprises:

- a twelfth-first transistor comprising a control electrode which receives the direct current inverter voltage, a first electrode which receives the direct current inverter voltage, and a second electrode connected to a twelfth intermediate node;
- a twelfth-second transistor comprising a control electrode which receives the direct current inverter voltage, a first electrode connected to the twelfth intermediate node, and a second electrode;
- a seventh transistor comprising a control electrode connected to the second electrode of the twelfth-second transistor, a first electrode which receives the direct current inverter voltage, and a second electrode connected to the third control node;
- a thirteenth transistor comprising a control electrode connected to the first control node, a first electrode connected to the control electrode of the seventh transistor, and a second electrode which receives the second low voltage; and
- an eight transistor comprising a control electrode connected to the first control node, a first electrode connected to the third control node, and a second electrode which receives the first low voltage.

7. The gate driver of claim 5, wherein each of the plurality of stages further comprises:

- a second pull-up control circuit which applies the first low voltage to the first control node in response to a second subsequent carry signal, wherein the second subsequent carry signal is one of the carry signals of the subsequent stages.

8. The gate driver of claim 5, wherein each of the plurality of stages further comprises:

- a first hold circuit which applies the first low voltage to the first control node in response to a signal of the third control node.

9. The gate driver of claim 5, wherein each of the plurality of stages further comprises:

- a second hold circuit which outputs the second low voltage as the gate output signal in response to a signal of the third control node.

10. The gate driver of claim 5, wherein each of the plurality of stages further comprises:

- a carry buffer circuit which outputs a carry clock signal as a carry signal in response to the signal of the first control node; and
- a carry pull-down circuit which outputs the first low voltage as the carry signal in response to the first subsequent carry signal.

11. The gate driver of claim 10, wherein each of the plurality of stages further comprises:

- a third hold circuit which outputs the first low voltage as the carry signal in response to a signal of the third control node.

12. The gate driver of claim 5, wherein each of the plurality of stages further comprises:

- a reset circuit which applies the first low voltage to the first control node in response to a reset signal.

13. The gate driver of claim 5, wherein each of the plurality of stages further comprises:

a sensing selection circuit which applies the previous carry signal to a sensing control node in response to a first sensing signal.

14. The gate driver of claim 13, wherein each of the plurality of stages further comprises:

a first sensing control circuit which applies a high gate voltage which defines a high level of the gate output signal to the first control node in response to a signal of the sensing control node and a second sensing signal; and a second sensing control circuit which applies the first low voltage to the third control node in response to the signal of the sensing control node and the second sensing signal.

15. The gate driver of claim 1, wherein each of the plurality of stages further comprises:

a second buffer circuit which outputs a second gate clock signal as a second gate output signal in response to the signal of the first control node; and a second pull-down circuit which outputs the second low voltage as the second gate output signal in response to the first subsequent carry signal.

16. The gate driver of claim 15, wherein each of the plurality of stages further comprises:

a fourth hold circuit which outputs the second low voltage as the second gate output signal in response to a signal of a third control node.

17. The gate driver of claim 1, wherein:

the buffer circuit comprises:

a first transistor comprising a control electrode connected to the first control node, a first electrode which receives the gate clock signal, and a second electrode connected to a gate output terminal; and a first capacitor comprising a first electrode connected to the control electrode of the first transistor and a second electrode connected to the gate output terminal, and the pull-down circuit comprises:

a second transistor comprising a control electrode which receives the first subsequent carry signal, a first electrode which receives the second low voltage, and a second electrode connected to the gate output terminal.

18. The gate driver of claim 17, wherein a capacitance of the first capacitor is greater than each of a capacitance of the first inter-node capacitor and a capacitance of the second inter-node capacitor.

19. A display device comprising:

a display panel;

a gate driver comprising a plurality of stages which output gate signals to gate lines of the display panel; and a data driver which outputs a data voltage to a data line of the display panel, wherein:

each of the plurality of stages comprises:

a first pull-up control circuit which applies a previous carry signal to a first control node in response to the previous carry signal, wherein the previous carry signal is one of carry signals of previous stages;

a buffer circuit which outputs a gate clock signal as a gate output signal in response to a signal of the first control node; and a pull-down circuit which outputs a second low voltage as the gate output signal in response to a first subsequent carry signal, wherein the first subsequent carry signal is one of carry signals of subsequent stages, and the first pull-up control circuit comprises:

a fourth-first transistor comprising a control electrode connected to a previous carry input node to which the previous carry signal is applied, a first electrode connected to the previous carry input node, and a second electrode connected to a second control node;

a fourth-second transistor comprising a control electrode connected to the previous carry input node, a first electrode connected to the second control node, and a second electrode connected to the first control node;

a first inter-node capacitor comprising a first electrode connected to the previous carry input node and a second electrode connected to the second control node; and a second inter-node capacitor comprising a first electrode connected to the second control node and a second electrode connected to the first control node.

20. An electronic apparatus comprising:

a display module comprising a display panel and a gate driver comprising a plurality of stages which output gate signals to gate lines of the display panel; and a power module comprising a power management circuit which supplies power to the display module, wherein:

each of the plurality of stages comprises:

a first pull-up control circuit which applies a previous carry signal to a first control node in response to the previous carry signal, wherein the previous carry signal is one of carry signals of previous stages;

a buffer circuit which outputs a gate clock signal as a gate output signal in response to a signal of the first control node; and a pull-down circuit which outputs a second low voltage as the gate output signal in response to a first subsequent carry signal, wherein the first subsequent carry signal is one of carry signals of subsequent stages, and the first pull-up control circuit comprises:

a fourth-first transistor comprising a control electrode connected to a previous carry input node to which the previous carry signal is applied, a first electrode connected to the previous carry input node, and a second electrode connected to a second control node;

a fourth-second transistor comprising a control electrode connected to the previous carry input node, a first electrode connected to the second control node, and a second electrode connected to the first control node;

a first inter-node capacitor comprising a first electrode connected to the previous carry input node and a second electrode connected to the second control node; and a second inter-node capacitor comprising a first electrode connected to the second control node and a second electrode connected to the first control node.

* * * * *